(12) United States Patent  (10) Patent No.: US 11,404,890 B1
Gu  (45) Date of Patent: Aug. 2, 2022

(54) STORAGE CASE AND CHARGING DEVICE FOR VR EQUIPMENT

(71) Applicant: Shenzhen Xinlian Youpin Technology Co., Ltd., Shenzhen (CN)

(72) Inventor: Jinxin Gu, Shenzhen (CN)

(73) Assignee: Shenzhen Xinlian Youpin Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/574,585

(22) Filed: Jan. 13, 2022

(30) Foreign Application Priority Data

Nov. 5, 2021 (CN) .......................... 202122707902.7

(51) Int. Cl.
*A45C 11/00* (2006.01)
*H02J 50/00* (2016.01)
*H02J 7/00* (2006.01)

(52) U.S. Cl.
CPC ............ *H02J 7/0044* (2013.01); *A45C 11/00* (2013.01); *H02J 50/005* (2020.01); *A45C 2011/003* (2013.01)

(58) Field of Classification Search
CPC .. A45C 2011/003; H01J 50/005; H02J 50/005
See application file for complete search history.

(56) References Cited

U.S. PATENT DOCUMENTS

| | | | |
|---|---|---|---|
| 2006/0144662 A1* | 7/2006 | Hu | A45C 13/02 190/110 |
| 2011/0204843 A1* | 8/2011 | Foster | H02S 40/38 320/101 |
| 2012/0262117 A1* | 10/2012 | Ferber | H02J 7/0047 320/111 |
| 2014/0151173 A1* | 6/2014 | Reh | A45C 13/42 190/18 A |
| 2016/0084454 A1* | 3/2016 | Svitak, Sr. | H02S 20/00 362/183 |
| 2016/0127619 A1* | 5/2016 | Witherspoon | A45C 5/14 348/86 |
| 2016/0157572 A1* | 6/2016 | Brilmyer | A62C 3/16 206/557 |
| 2016/0355299 A1* | 12/2016 | Lapoint | A45C 13/02 |
| 2018/0109279 A1* | 4/2018 | Rana | H02J 7/00 |
| 2020/0222816 A1* | 7/2020 | Mercier | A63F 13/98 |
| 2020/0383441 A1 | 12/2020 | Kan et al. | |
| 2021/0167630 A1* | 6/2021 | Zhao | H02J 50/402 |
| 2021/0376661 A1* | 12/2021 | Bohn | H02J 50/005 |

FOREIGN PATENT DOCUMENTS

CN 110568628 A 12/2019
CN 214509908 U 10/2021

* cited by examiner

*Primary Examiner* — Hung V Ngo (57) ABSTRACT

The present disclosure provides a storage case and charging device. The storage case and charging device for a VR equipment includes a lower housing having an accommodation groove for accommodating the VR equipment; an upper housing covering the accommodation groove and detachably connected with the lower housing; a battery disposed in the lower housing; and a first charging plug disposed in the accommodation groove and electrically connected to the battery. The first charging plug is configured for inserting into and electrically connecting to a first charging port of the VR equipment for charging the VR equipment.

15 Claims, 7 Drawing Sheets

STORAGE CASE AND CHARGING DEVICE FOR VR EQUIPMENT

CROSS-REFERENCE TO RELATED APPLICATIONS

This application claims priority to Chinese Patent Application No. 202122707902.7, filed on Nov. 5, 2021, the entire contents of which are incorporated by reference herein.

FIELD

The present disclosure relates to virtual reality technology field, and specifically to a storage case and charging device for a VR equipment.

BACKGROUND

A VR (virtual reality) equipment generally refers to a virtual reality head mounted display device. It is a product that uses a combination of simulation technology, computer graphics, man-machine interface technology, multimedia technology, sensor technology, network technology and other technologies to display images for a left eye and a right eye respectively through a left eye screen and a right eye screen, and cooperate with ear phones and other devices to make people get a strong sense of immersion.

The VR equipment has been popular with people since it was launched. However, due to fine internal structure, it needs to be stored carefully, which makes it inconvenient for people to store and carry the VR equipment. At the same time, with frequent use of the VR equipment, its charging problem is also puzzled users. However, an existing accommodation device for a VR equipment on the market only provides an accommodation space, and the VR equipment may move in the accommodation space. When the user carry the VR equipment by the existing accommodation device, it is easy to get damage to the VR equipment.

Therefore, the present disclosure provides a storage case and charging device for a VR equipment, which can charge the VR equipment while stably storing the VR equipment, and effectively solve the above problems.

SUMMARY

In order to overcome the disadvantage of the existing accommodation device, the present disclosure provides a storage case and charging device for a VR equipment, which has the advantages of simple structure, convenient use, good storage and charging effect.

The present disclosure adopts the following technical solution: a storage case and charging device for a VR equipment including: a lower housing having an accommodation groove for accommodating the VR equipment; an upper housing covering the accommodation groove and detachably connected with the lower housing; a battery disposed in the lower housing; and a first charging plug disposed in the accommodation groove and electrically connected to the battery, and the first charging plug configured for inserting into and electrically connecting to a first charging port of the VR equipment for charging the VR equipment; a handle rotately connected with a surface of the lower housing, a shaft hole with an oval shape disposed on the handle; a rotation shaft disposed on the surface of the lower housing, and the rotation shaft slidably disposed in the shaft hole; a hanging ring disposed on an end of the rotation shaft and rotately connected with the end of the rotation shaft, the hanging ring configured to rotate to be exposed from the end of the rotation shaft so as to hang other products, wherein when the storage case and charging device is lifted, the rotation shaft moves along the shaft hole and slides into a lower end of the shaft hole, and the rotation shaft rotates at the lower end of the shaft hole; when the handle is pressed down, the rotation shaft moves along the shaft hole to an upper end of the shaft hole such that the handle is close to the surface of the lower housing.

Further, a magnetic module is disposed on the first charging plug, and the magnetic module is configured to connect to the first charging port of the VR equipment by magnetic force.

the magnetic module comprises a magnetic ring, the magnetic ring is disposed on an end of the first charging plug, a through hole is disposed on a middle region of the magnetic ring, and connection pins of the first charging plug correspond to the through hole.

Further, the accommodation groove matches a shape of the VR equipment.

Further, a first restriction portion, a second restriction portion, and a third restriction portion are disposed in the accommodation groove, and the accommodation groove is divided into a first accommodation part, a second accommodation part, a third accommodation part and a fourth accommodation part by the first restriction portion, the second restriction portion, and the third restriction portion.

Further, the first restriction portion and the second restriction portion are arc-shaped.

Further, the first restriction portion, the second restriction portion part and the third restriction portion protrude from a bottom part of the accommodation groove.

Further, a fourth restriction portion is disposed on the upper housing, and when the upper housing covers the accommodation groove, the fourth restriction portion contacts with a surface of the VR equipment.

Further, the fourth restriction portion is an elastic restriction block with smooth edges.

Further, a fifth restriction portion is disposed in the second accommodation part, and the fifth restriction portion is configured to contact with surfaces of an ear phone and other accessories.

Further, a control circuit board is disposed in the lower housing, the control circuit board is electrically connected to the battery, and the first charging plug is connected to the control circuit board.

Further, a second charging port is disposed on the lower housing, the second charging port is electrically connected to the battery and the control circuit board.

Further, at least one indicator light is disposed on a side wall of the lower housing, the at least one indicator light is electrically connected to the battery and the control circuit board.

Further, the at least one indicator light comprises a red indicator light and at least two green indicator lights, the red indicator light is configured to indicate the low battery, the number of green indicator lights are configured to indicate remaining power of the battery, and when the red indicator light flashes, it means the storage case and charging device failure.

Further, a transparent observation window is disposed on the upper housing, the transparent observation window is configured to allow light to pass through.

The present disclosure also has the beneficial effects: through above structure, the battery is dispose in the lower housing, the first charging plug is electrically connected to the battery, when the VR equipment is placed in the accommodation groove, the first charging plug is inserted into the first charging port of the VR equipment to electrically connect the VR equipment and the battery, so that the battery can supply the VR equipment and effectively improve endurance of the VR equipment. The storage case and charging device can charge the VR equipment while storing it, simplify the user's operation and improve the user experience. Further, the VR equipment can be placed, effectively stored and fixed in the accommodation groove, so as to prevent the VR equipment from being damaged when the user carries the storage case and charging device with the VR equipment, and effectively ensure property safety of the user. Moreover, when the user lifts the storage case and charging device with the VR equipment, the rotation shaft moves along the shaft hole and slides into a lower end of the shaft hole, and the rotation shaft rotates at the lower end of the shaft hole, and when the VR equipment is stored in the storage case and charging device, the user can press down the handle, and the rotation shaft moves along the shaft hole to an upper end of the shaft hole, thus, the handle is close to the surface of the lower housing, which effectively reduces the size of the storage case and charging device with the VR equipment and facilitates the user store the storage case and charging device with the VR equipment; and when the storage case and charging device is in the close state, the hanging ring can be close to the end of the rotation shaft so as to reduce the size of the storage case and charging device. When it needs to use the hanging ring, the hanging ring can be rotated to be exposed from the end of the rotation shaft, which is convenient for the user to hang other products (such as key chains, decorative pendants, etc.) on the hanging ring, so that the user do not need to carry other products during lifting the handle 40, so as to improve the user experience.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

Figure 1:
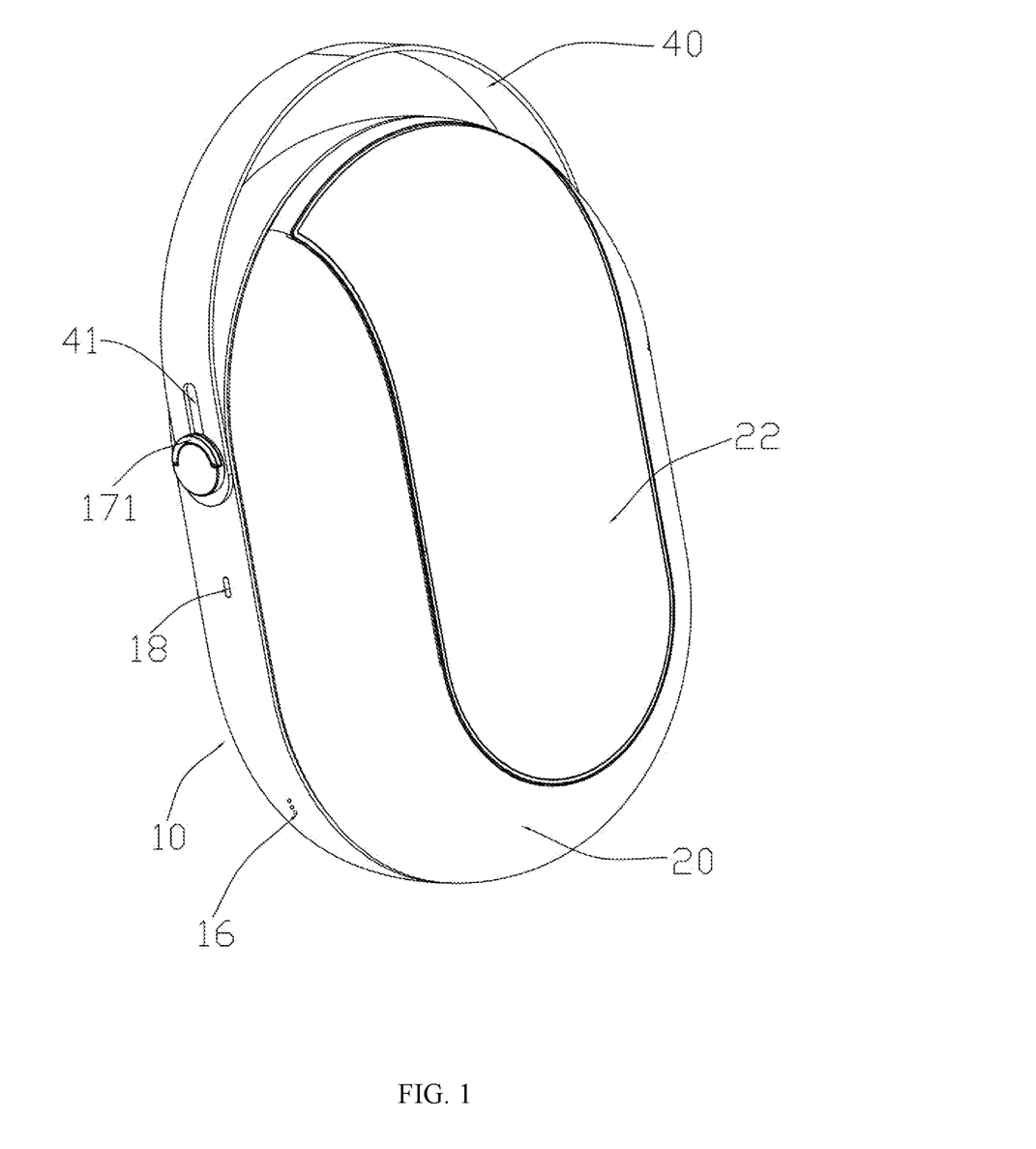
FIG. 1 is an explosive view of a storage case and charging device in a close state according to one embodiment of the present disclosure.
Figure 2:
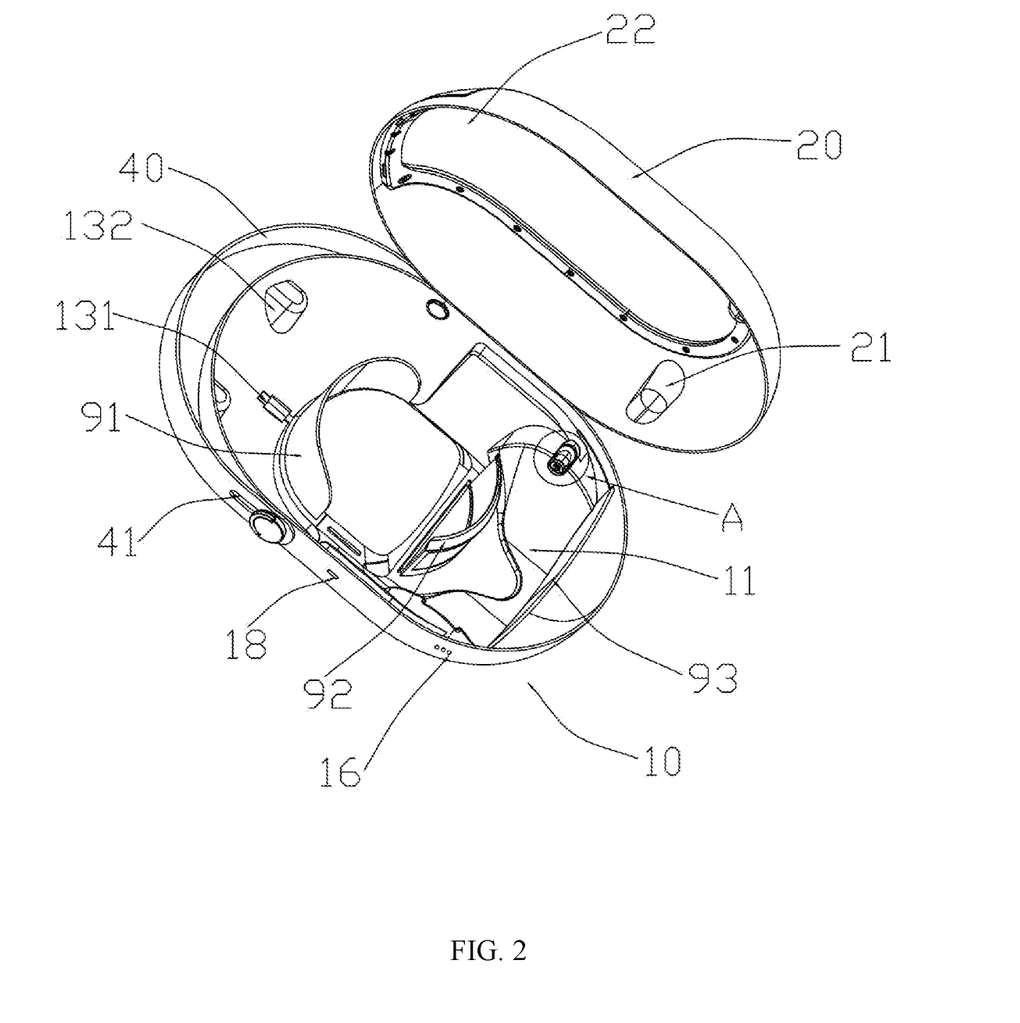
FIG. 2 is an explosive view of the storage case and charging device of FIG. 1 in an open state.
Figure 3:
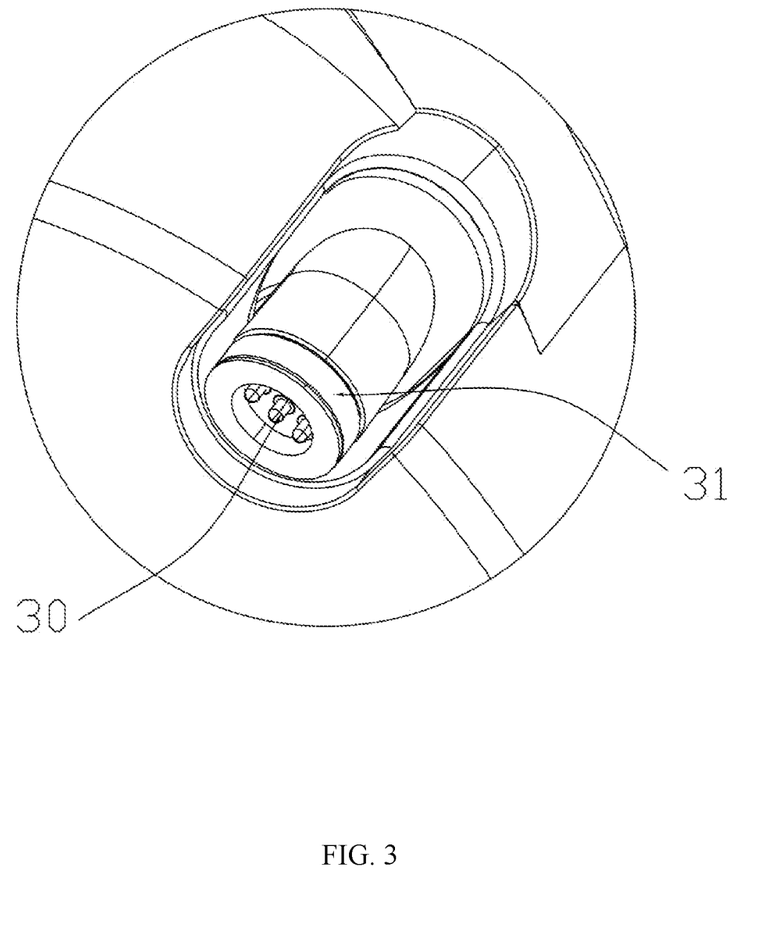
FIG. 3 is an enlarge view of part A of FIG. 2.
Figure 4:
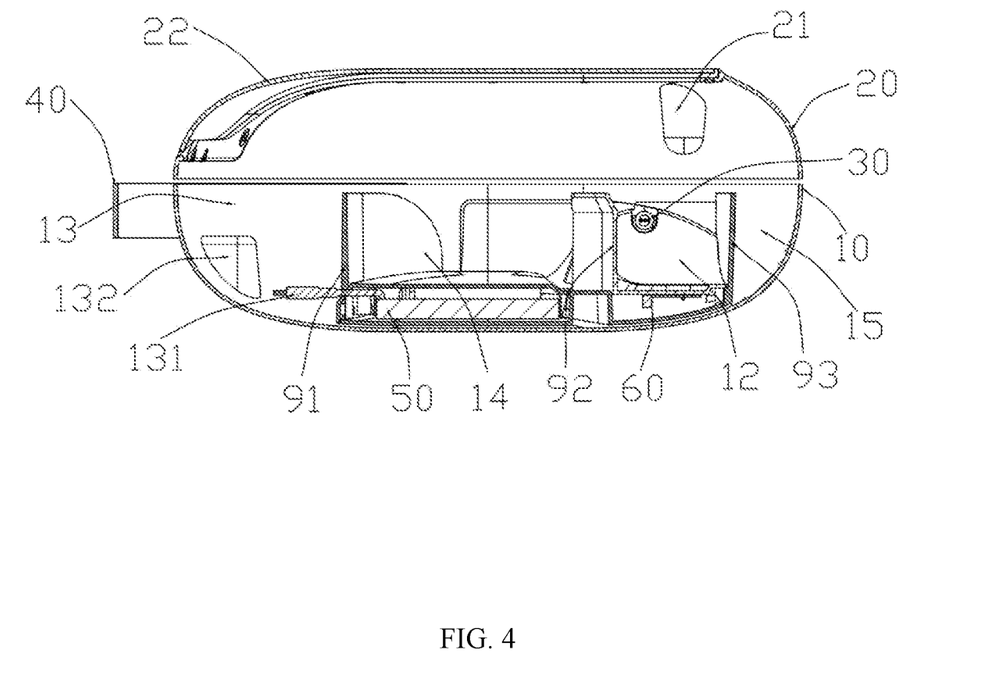
FIG. 4 is a cross-section view of the storage case and charging device of FIG. 1.
Figure 5:
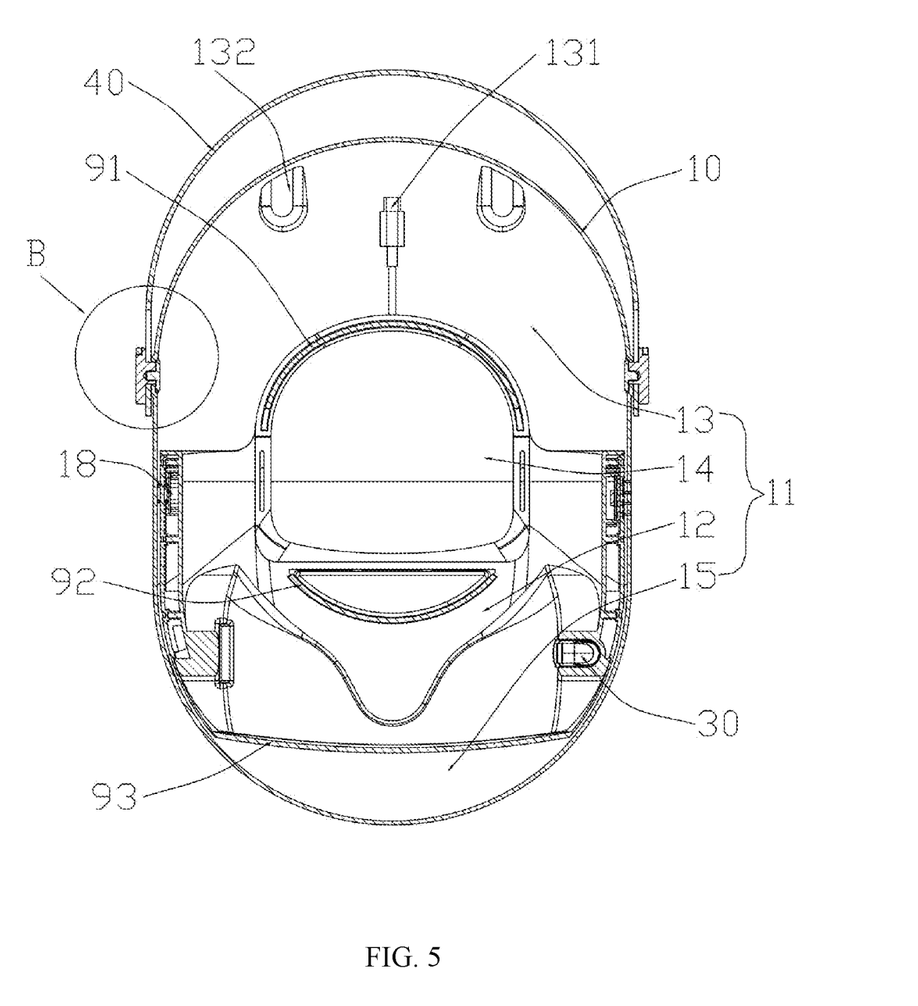
FIG. 5 is another cross-section view of the storage case and charging device of FIG. 1.
Figure 6:
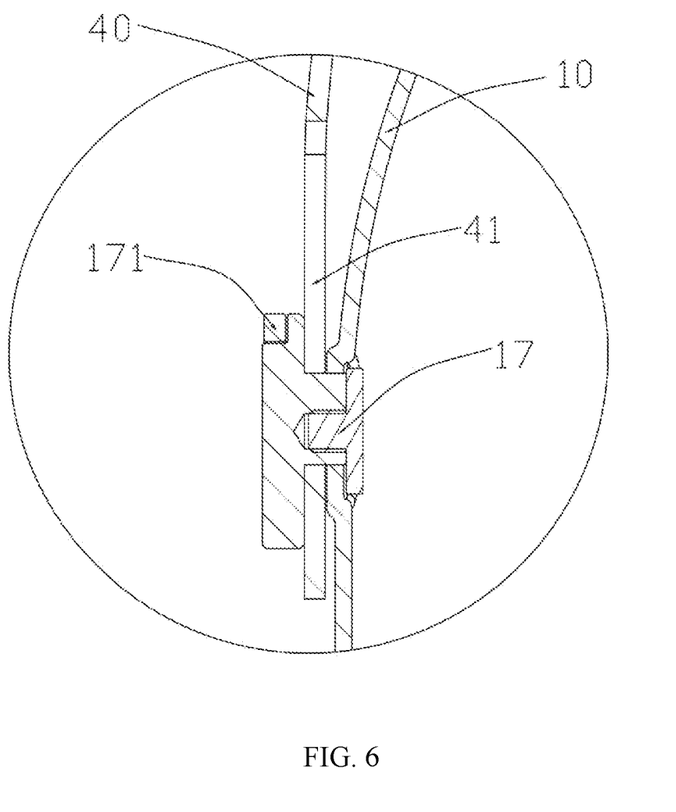
FIG. 6 is an enlarge view of part B of FIG. 5.
Figure 7:
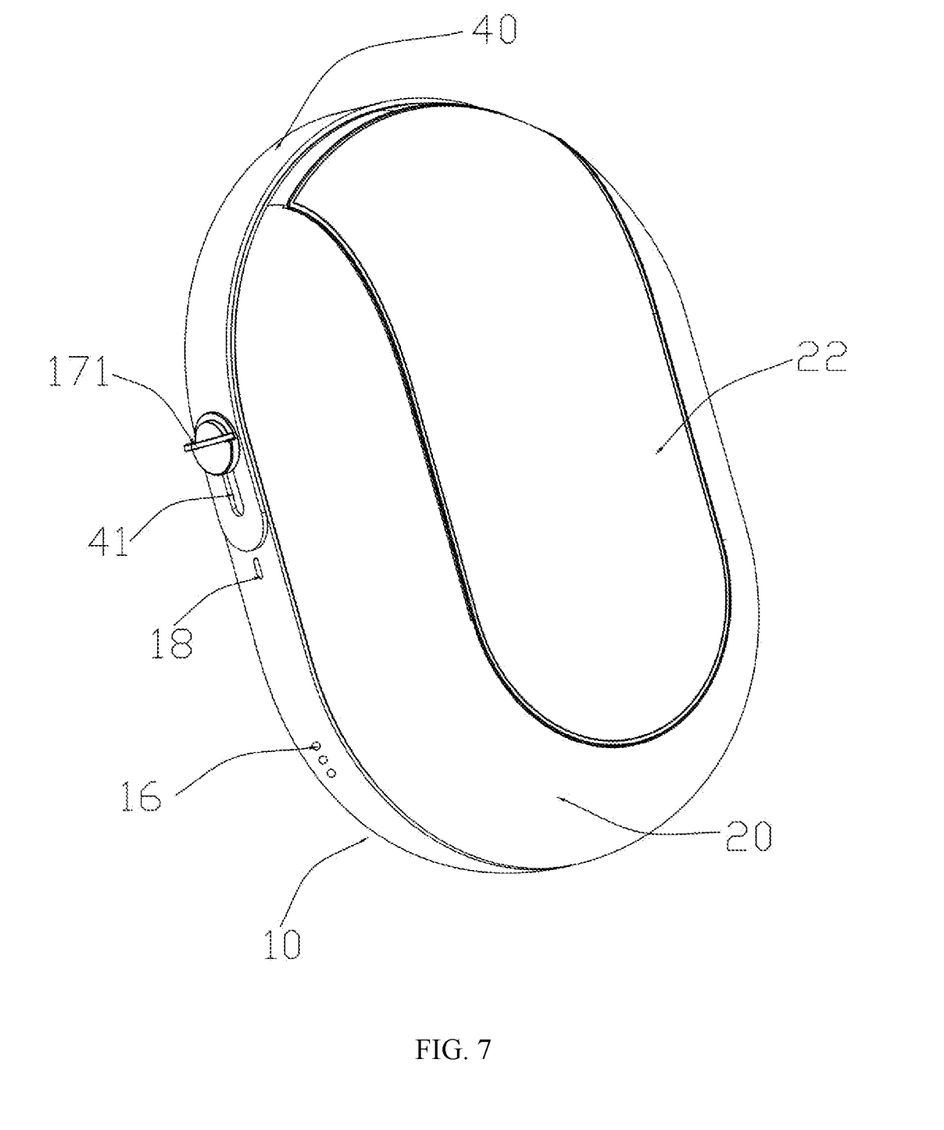
FIG. 7 is another explosive view of the storage case and charging device of FIG. 1 in the close state.

Referring to FIGS. 1-7, a storage case and charging device for a VR equipment includes a lower housing 10 having an accommodation groove 11 for accommodating the VR equipment, an upper housing 20 covering the accommodation groove 11 and detachably connected with the lower housing 10, a battery 50 disposed in the lower housing 10, and a first charging plug 30 disposed in the accommodation groove 11 and electrically connected to the battery 50, and the first charging plug 30 configured for inserting into and electrically connecting to a first charging port of the VR equipment for charging the VR equipment.

Through above structure, the battery 50 is dispose in the lower housing 10, and the first charging plug 30 is electrically connected to the battery 50, when the VR equipment is placed in the accommodation groove 11, the first charging plug 30 is inserted into the first charging port of the VR equipment to electrically connect the VR equipment and the battery 50, so that the battery 50 can supply power to the VR equipment and effectively improve endurance of the VR equipment. The storage case and charging device can charge the VR equipment while storing it, simplify user's operation and improve user experience. Further, the VR equipment can be placed, effectively stored and fixed in the accommodation groove 11, so as to prevent the VR equipment from being damaged when the user carries the storage case and charging device with the VR equipment, and effectively ensure property safety of the user.

In the embodiment a magnetic module 31 is disposed on the first charging plug 30, and the magnetic module 31 is configured to connect to the first charging port of the VR equipment by magnetic force. Through above structure, the VR equipment can be placed, effectively stored and fixed in the accommodation groove 11, so as to prevent the VR equipment from being damaged when the user carries the storage case and charging device with the VR equipment Through the magnetic module 31, the first charging plug can be automatically set and inserted into the first charging port of the VR equipment, so as to effectively charge the VR equipment, improve endurance of the VR equipment and provide a good user experience.

In the embodiment, the magnetic module 31 can be a magnetic ring, the magnetic ring is disposed on an end of the first charging plug 30. A through hole is disposed on a middle region of the magnetic ring, and connection pins of the first charging plug 30 correspond to the through hole. The magnetic ring can ensure a force between the first charging plug and the VR equipment balance, make the first charging plug more firmly connect to the VR equipment, improve stability of the storage case and charging device, make the first charging plug more stably charge the VR equipment, protect the connection pins of the first charging plug 30, and effectively ensure service life of the storage case and charging device.

In the embodiment, the accommodation groove 11 matches a shape of the VR equipment. Through above structure, the VR equipment can be fixed and restricted in the accommodation groove to prevent the VR equipment from moving, effectively protect the VR equipment and improve stability of the storage case and charging device.

In the embodiment, a first restriction portion 91, a second restriction portion 92, and a third restriction portion 93 are disposed in the accommodation groove 11, and the accommodation groove 11 is divided into a first accommodation part 12, a second accommodation part 13, a third accommodation part 14 and a fourth accommodation part 15 by the first restriction portion 91, the second restriction portion 92, and the third restriction portion 93. Through above structure, the first restriction portion 91, the second restriction portion 92 part and the third restriction portion 93 protrude from a bottom part of the accommodation groove 11, and the accommodation groove 11 is divided into the first accommodation part 12, the second accommodation part 13, the third accommodation part 14 and the fourth accommodation part 15. The first accommodation part 12 can be used to store a VR glasses/VR head display of the VP equipment, and the second accommodation part 13 can be used to store other accessories such as a headband of the VR equipment. The third accommodation part 14 can accommodate accessories such as a handle of the VR equipment, and the fourth accommodation part 15 can accommodate small accessories such as a data cable and a second charging plug of the VR equipment. The separated accommodation parts can store each element of the VR equipment separately, prevent collision between each element, effectively ensure the stability of the storage case and charging device, and make each element be stored more regularly and provide convenience to the user.

In the embodiment, the first restriction portion 91 and the second restriction portion 92 are arc-shaped. Through above structure, outer surfaces of the arc-shaped first restriction portion 91 and the second restriction portion 92 can effectively fit an inner surface of an ear phone and an inner side of the VR glasses/VR head display, and can more stably and fully contact the VR glasses/VR head display and the accessories of the VR equipment, so as to further improve the stability of the storage case and charging device.

In the embodiment, a fourth restriction portion 21 is disposed on the upper housing 20, and when the upper housing 20 covers the accommodation groove 11, the fourth restriction portion 21 contacts with an upper surface of the VR equipment. Through above structure, the fourth restriction portion 21 can contact with and butt against the upper surface of the VR device to further restrict the VR device, prevent the VR equipment from moving up and down, and further improve the stability of the storage case and charging device.

In the embodiment, the fourth restriction portion 21 is an elastic restriction block with smooth edges. Through above structure, due to elasticity of the elastic restriction block, when the elastic restriction block contacts with and butts against the upper surface of the VR device, the elastic restriction block is elastically deformed and effectively butts against the upper surface of the VR equipment to restrict the VR equipment and prevent the upper surface of the VR equipment from shifting. Moreover, with the smooth edges edge and the elasticity, the elastic restriction block can prevent the upper surface of the VR equipment from damaging, so as to protect the VR equipment and effectively improve the user experience.

In the embodiment, a fifth restriction portion 132 is disposed in the second accommodation part 13, and the fifth restriction portion 132 is configured to contact with and but against surfaces of the ear phone and other accessories. Through above structure, the fifth restriction portion 132 can contact with and but against one side surface of the accessories such as the ear phone, and the other end of the first restriction portion 91 can contact with and but against the other side surface of the accessories such as the ear phone, so as to effectively restrict the accessories such as the ear phone and ensure the stability of the storage case and charging device.

In the embodiment, the storage case and charging device further includes a handle 40, and the handle 40 is rotately connected with a surface of the lower housing 10. Through above structure, the handle 40 can facilitate the user to lift and carry the storage case and charging device with the VR equipment. Preferably, when the user lifts the handle 40, gravity center of the storage case and charging device and the handle 40 are arranged along the same vertical line, which can make the storage case and charging device with stress uniform, further facilitate the user to lift the storage case and charging device with the VR equipment, and effectively improve the user experience.

In the embodiment, a rotation shaft 17 is disposed on the surface of the lower housing 10, a shaft hole 41 with an oval shape is disposed on the handle 40, and the rotation shaft 17 is slidably disposed in the shaft hole 41. Through above structure, when the user lifts the storage case and charging device with the VR equipment, the rotation shaft 17 moves along the shaft hole 41 and slides into a lower end of the shaft hole 41, and the rotation shaft 17 rotates at the lower end of the shaft hole 41. When the VR equipment is stored in the storage case and charging device, the user can press down the handle 50, and the rotation shaft 17 moves along the shaft hole 41 to an upper end of the shaft hole 41, thus, the handle 50 is close to the surface of the lower housing 10, which effectively reduces the size of the storage case and charging device with the VR equipment and facilitates the user store the storage case and charging device with the VR equipment.

In the embodiment, a control circuit board 60 is disposed in the lower housing 10, the control circuit board 60 is electrically connected to the battery 50, and the first charging plug 30 is connected to the control circuit board 60. Through above structure, the battery 50 can separate the storage case and charging device from mains power, facilitate the user to charge the VR equipment outdoors, and effectively improve the endurance of the VR equipment. The design of the control circuit board 60 can effectively adjust input/output power, voltages and currents when the storage case and charging device is connected to the mains power, the VR equipment and other electrical devices, so as to protect the storage case and charging device, the VR equipment and other electrical devices.

In the embodiment, a second charging plug 131 is disposed on the second accommodation part 13, and the second charging plug 131 is electrically connected the battery 50 and the control circuit board 60. Through above structure, the second charging plug 132 is placed in the second accommodation part 13, so as to charge the electrical devices (such as such as earphones or mobile phones) placed in the second accommodation part 13 and effectively improve applicability of the storage case and charging device and provide a better user experience.

In the embodiment, a hanging ring 171 is disposed on an end of the rotation shaft 17 and rotately connected with the end of the rotation shaft 17. Through above structure, when the storage case and charging device is in the close state, the hanging ring 171 can be close to the end of the rotation shaft 17 so as to reduce the size of the storage case and charging device 10. When it needs to use the hanging ring 171, the hanging ring 171 can be rotated to be exposed from the end of the rotation shaft 17, which is convenient for the user to hang other products (such as key chains, decorative pendants, etc.) on the hanging ring 171, so that the user do not need to carry other products during lifting the handle 40, so as to improve the user experience.

In the embodiment, a second charging port 18 is disposed on the lower housing 10, the second charging port 18 is electrically connected to the battery 50 and the control circuit board 60. Through above structure, the user can insert an charging cable into the charging second charging port 18 and connect the battery 50 to the mains power, so as to effectively charge the battery 50 and improve the endurance of the storage case and charging device; Moreover, the storage case and charging device can also be electrically connected with other electronic devices (such as computer) through USB port to transmit power and information.

In the embodiment, at least one indicator light 16 is disposed on a side wall of the lower housing 10, the indicator light 16 is electrically connected to the battery 50 and the control circuit board 60. Through above structure, the indicator lights 16 can be used to prompt the user remaining power, charging state and use state of the storage case and charging device. For example, when a red indicator light 16 is lighted, it prompts the user that the battery 50 is low, the number of green indicator lights 16 prompts remaining power of the battery 50, and when the red indicator light 16 flashes, it means the storage case and charging device failure and prompts the user to check and repair the storage case and charging device.

In the embodiment, a transparent observation window 22 is disposed on the upper housing 20, the transparent observation window 22 is configured to allow light to pass through. Through above structure, the transparent observation window 22 can facilitate the user to observe the VR equipment and other electronic devices inside the storage case and charging device, which can not only make the storage case and charging device beautiful, concise and generous, but also facilitate the user to observe the VR equipment contained in the storage case and charging device, so as to give a better user experience.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. An storage case and charging device for a VR equipment, comprising:
   a lower housing, comprising an accommodation groove for accommodating the VR equipment;
   an upper housing covering the accommodation groove and detachably connected with the lower housing;
   a battery disposed in the lower housing;
   a first charging plug disposed in the accommodation groove and electrically connected to the battery, and the first charging plug configured for inserting into and electrically connecting to a first charging port of the VR equipment for charging the VR equipment;
   a handle rotately connected with a surface of the lower housing, a shaft hole with an oval shape disposed on the handle;
   a rotation shaft disposed on the surface of the lower housing, and the rotation shaft slidably disposed in the shaft hole;
   a hanging ring disposed on an end of the rotation shaft and rotately connected with the end of the rotation shaft, the hanging ring configured to rotate to be exposed from the end of the rotation shaft so as to hang other products,
   wherein when the storage case and charging device is lifted, the rotation shaft moves along the shaft hole and slides into a lower end of the shaft hole, and the rotation shaft rotates at the lower end of the shaft hole;
   when the handle is pressed down, the rotation shaft moves along the shaft hole to an upper end of the shaft hole such that the handle is close to the surface of the lower housing.

2. The storage case and charging device of claim 1, wherein a magnetic module is disposed on the first charging plug, and the magnetic module is configured to connect to the first charging port of the VR equipment by magnetic force.

3. The storage case and charging device of claim 2, wherein the magnetic module comprises a magnetic ring, the magnetic ring is disposed on an end of the first charging plug, a through hole is disposed on a middle region of the magnetic ring, and connection pins of the first charging plug correspond to the through hole.

4. The storage case and charging device of claim 1, wherein the accommodation groove matches a shape of the VR equipment.

5. The storage case and charging device of claim 4, wherein the first restriction portion and the second restriction portion are arc-shaped.

6. The storage case and charging device of claim 4, wherein the first restriction portion, the second restriction portion part and the third restriction portion protrude from a bottom part of the accommodation groove.

7. The storage case and charging device of claim 4, wherein a fifth restriction portion is disposed in the second accommodation part, and the fifth restriction portion is configured to contact with surfaces of an ear phone and other accessories.

8. The storage case and charging device of claim 1, wherein a first restriction portion, a second restriction portion, and a third restriction portion are disposed in the accommodation groove, and the accommodation groove is divided into a first accommodation part, a second accommodation part, a third accommodation part and a fourth accommodation part by the first restriction portion, the second restriction portion, and the third restriction portion.

9. The storage case and charging device of claim 1, wherein a fourth restriction portion is disposed on the upper housing, and when the upper housing covers the accommodation groove, the fourth restriction portion contacts with a surface of the VR equipment.

10. The storage case and charging device of claim 9, wherein the fourth restriction portion is an elastic restriction block with smooth edges.

11. The storage case and charging device of claim 1, wherein a control circuit board is disposed in the lower housing, the control circuit board is electrically connected to the battery, and the first charging plug is connected to the control circuit board.

12. The storage case and charging device of claim 11, wherein a second charging port is disposed on the lower housing, the second charging port is electrically connected to the battery and the control circuit board.

13. The storage case and charging device of claim 11, wherein at least one indicator light is disposed on a side wall of the lower housing, the at least one indicator light is electrically connected to the battery and the control circuit board.

14. The storage case and charging device of claim 13, wherein the at least one indicator light comprises a red indicator light and at least two green indicator lights, the red indicator light is configured to indicate the low battery, the number of green indicator lights are configured to indicate remaining power of the battery, and when the red indicator light flashes, it means the storage case and charging device failure.

15. The storage case and charging device of claim 1, wherein a transparent observation window is disposed on the upper housing, the transparent observation window is configured to allow light to pass through.

\* \* \* \* \*